United States Patent [19]

Blum et al.

[11] Patent Number: 5,126,393

[45] Date of Patent: Jun. 30, 1992

[54] WATER-DISPERSIBLE BINDER COMPOSITION, A PROCESS FOR THE PRODUCTION OF A STOVING FILLER AND A COATING PREPARED THEREFROM

[75] Inventors: Harald Blum, Wachtendonk; Jürgen Meixner, Krefeld; Josef Pedain; Hans-Heribert Burgdörfer, both of Cologne, all of Fed. Rep. of Germany

[73] Assignee: Bayer Aktiengesellschaft, Fed. Rep. of Germany

[21] Appl. No.: 602,595

[22] Filed: Oct. 24, 1990

[30] Foreign Application Priority Data

Nov. 1, 1989 [DE]  Fed. Rep. of Germany ....... 3936288

[51] Int. Cl.$^5$ .................... C28L 77/00; C28L 75/00
[52] U.S. Cl. .................... 524/538; 524/590; 524/591
[58] Field of Search .................. 524/538, 590, 591

[56] References Cited

U.S. PATENT DOCUMENTS

| | | | |
|---|---|---|---|
| 4,331,573 | 5/1982 | Zabrocki | 524/591 |
| 4,606,947 | 8/1986 | Heinrich et al. | 427/388 |
| 4,791,168 | 12/1988 | Salatin et al. | 524/601 |
| 4,968,536 | 11/1990 | Goldner et al. | 524/512 |

FOREIGN PATENT DOCUMENTS

| | | |
|---|---|---|
| 0140323 | 5/1985 | European Pat. Off. . |
| 0157291 | 10/1985 | European Pat. Off. . |
| 0278394 | 2/1988 | European Pat. Off. . |
| 0330139 | 2/1989 | European Pat. Off. . |
| 0355682 | 2/1990 | European Pat. Off. . |
| 0379007 | 7/1990 | European Pat. Off. . |

*Primary Examiner*—Paul R. Michl
*Assistant Examiner*—Peter Scekely
*Attorney, Agent, or Firm*—Joseph C. Gil

[57] ABSTRACT

The present invention relates to a water-dispersible binder composition which is suitable for the production of a stoving filler to be processed from the aqueous phase and which contains a) 65 to 95% by weight of a urethane-modified polyester resin containing carboxyl groups,
b) 5 to 35% by weight of a crosslinker resin and
c) 0 to 2% by weight of an emulsifier, wherein the percentages are based on the total weight of components a) to c), characterized in that component a) has an acid value of 15 to 36, a hydroxyl value of at least 40 and a molecular weight ($M_w$) of 5,000 to 50,000 and has been obtained by reacting a1) 72 to 80% by weight of a polyester polyol having a hydroxyl value of 130 to 200 and an acid value of 1 to 5 and
a2) 4 to 7% by weight of a 2,2-bis-(hydroxymethyl)-alkane carboxylic acid or a quantity corresponding to this quantity of acid of a tertiary amine salt of such an acid with
a3) 15 to 24% by weight of at least one cycloaliphatic diisocyanate having a molecular weight of 166 to 294, wherein the percentages are based on the total weight of components a1) to a3).

The present invention also relates to a process for the production of an aqueous stoving filler which is suitable for the production of chip resistant coatings and to the chip resistant coatings produced therefrom.

12 Claims, No Drawings

WATER-DISPERSIBLE BINDER COMPOSITION, A PROCESS FOR THE PRODUCTION OF A STOVING FILLER AND A COATING PREPARED THEREFROM

BACKGROUND OF THE INVENTION

1. Field of the Invention

The present invention relates to a water-dispersible binder composition which is suitable for the production of a stoving filler to be processed from aqueous phase, to a process for the production of this stoving filler and to its use for the production of chip resistant coatings.

2. Description of the Prior Art

The production of chip resistant paint coatings is of considerable interest, particularly in the automotive field. Previously, solvent-containing coating compositions have largely been used for this purpose. For example, DE-OS 3,337,394 describes a chip resistant paint based on polyesters and blocked isocyanates which contains typical organic solvents for paints. However, for economic reasons and for reducing environmental pollution, increasing attempts are being made to avoid organic solvents in paints to the extent possible.

A filler for the painting of automobiles has to satisfy a number of requirements. It has to have good levelling properties in order to level out any unevenness in the substrate; it also has to show very good adhesion values both to the substrate and to the finishing paint; and it has to retain those adhesion values, even in the event of overstoving. The filler must be chip-resistant and must produce good results in the condensation/salt spray test in order to support the corrosion-inhibiting effect of the paint. It has to be solvent resistant so that it is not dissolved by the additional layers of paint (e.g., top coats). In addition, it must be resistant to yellowing and support the high film quality of the additional paint layers. EP-A-330,139 describes a process for producing chip resistant coatings in which two layers, namely a chip resistant intermediate primer and a hydrofiller, are applied and are stoved by the wet-on-wet method. This method requires the additional application of a paint coating and is therefore very expensive and time-consuming because it is more favorable to satisfy all of the stated requirements with the same filler layer.

In addition, the carboxyl-functional polyester binders used in EP-A-330,139 have only a limited shelf life because they are vulnerable to hydrolysis.

EP-A-278,394 describes water-dilutable fillers based on polyether urethanes which habe been produced using polyols based on vegetable oils. The polyurethanes produced from these starting materials and hydrophilically modified by anionic dihydroxy and/or diamino compounds are used in particular as additives for aqueous alkyd resin emulsions. To obtain good film properties, therefore, the polyurethanes have to be combined with other binders.

In the preferred process described in EP-A-278,394, polyether polyols and oleochemical polyols are first reacted with a diisocyanate to form an isocyanate-functional prepolymer which is then reacted with the dihydroxy compound containing ionic groups. This process has the disadvantage that at least two and, according to the examples, three different polyol precursors are required for producing the NCO-terminated prepolymer. In addition, only tertiary (i.e., non-NCO-reactive amines, such as triethylamine and N-methyl morpholine) can be used in the described processes. In addition, it is stated in EP-A-278,394 that, when only one polyol as opposed to the polyol composition according to the invention is used, the products obtained have considerably poorer film properties.

An object of the present invention is to provide a stoving filler binder which satisfies all of the previously discussed requirements when the filler is applied in a single layer. An additional object of the present invention is to provide a filler which is easy to produce and has a long shelf life.

Surprisingly, these objects may be achieved by the binder composition and the process for producing a stoving filler which are described in detail hereinafter.

SUMMARY OF THE INVENTION

The present invention relates to a water-dispersible binder composition which is suitable for the production of a stoving filler to be processed from the aqueous phase and which contains a) 65 to 95% by weight of a urethane-modified polyester resin containing carboxyl groups, b) 5 to 35% by weight of a crosslinker resin and c) 0 to 2% by weight of an emulsifier, wherein the percentages are based on the total weight of components a) to c), characterized in that component a) has an acid value of 15 to 36, a hydroxyl value of at least 40 and a molecular weight ($M_w$) of 5,000 to 50,000 and has been obtained by reacting a1) 72 to 80% by weight of a polyester polyol having a hydroxyl value of 130 to 200 and an acid value of 1 to 5 and a2) 4 to 7% by weight of a 2,2-bis-(hydroxymethyl)-alkane carboxylic acid or a quantity corresponding to this quantity of acid of a tertiary amine salt of such an acid with a3) 15 to 24% by weight of at least one cycloaliphatic diisocyanate having a molecular weight of 166 to 294, wherein the percentages are based on the total weight of components a1) to a3).

The present invention also relates to a process for the production of an aqueous stoving filler for the production of chip resistant coatings, characterized in that, in a first step, a polyester polyol a1) having a hydroxyl value of 130 to 200 and an acid value of 1 to 5 is prepared by reacting a1.1) 2 to 11% by weight of at least one aliphatic monocarboxylic acid having a molecular weight of 122 to 340, a1.2) 17 to 27% by weight of at least one aliphatic dicarboxylic acid having a molecular weight of 116 to 600, a1.3) 20 to 30% by weight of at least one aromatic or cycloaliphatic dicarboxylic acid having a molecular weight of 166 to 172 and/or at least one anhydride of such an acid, a1.4) 27 to 41% by weight of at least one aliphatic or cycloaliphatic diol having a molecular weight of 62 to 400, provided that at least 50% by weight of this component is based on a diprimary diol containing 5 to 8 carbon atoms, and a1.5) 13 to 21% by weight of at least one trihydric or tetrahydric alcohol having a molecular weight of 92 to 300, wherein the percentages are based on the total weight of components a1.1) to a1.5), in a second step, 72 to 80% by weight of the polyester a1) are reacted with 4 to 7% by weight of a 2,2-bis-(hydroxymethyl)alkane carboxylic acid a2) or with a quantity corresponding to this quantity of acid of a tertiary amine salt of such an acid and 15 to 24% by weight of a cycloaliphatic diisocyanate a3) having a molecular weight of 166 to 294 in the presence of an inert solvent at 50° to 140° C. to form a urethane-modified polyester resin a) which is present in organic solution and has a molecular weight ($M_w$) of 5,000 to 50,000, an acid value of 15 to 36 and a hydroxyl value of at least 40, the percentages being based on the total weight of components a) to c), and in a third step, optionally after addition of emulsifiers c) in such a quantity that a ratio by weight of urethane-modified polyester resin a) to emulsifier c) of 65:2 to 95:0 is maintained, the organic solution is mixed with water, the crosslinker resin component b) is added so that a ratio by weight of components a) and b) of 65:35 to 95:5 is maintained, any carboxyl groups still present in component a) optionally being converted at least partly into carboxylate groups with ammonia or an amine after the third step has been completed.

Finally, the invention also relates to the use of the stoving filler obtained by this process for the production of chip resistant coatings, especially on motor vehicles or parts of motor vehicles.

DETAILED DESCRIPTION OF THE INVENTION

The binder compositions according to the invention are based on the above-mentioned individual components a), b) and optionally c) in the quantitative ratios set forth. The binder compositions according to the invention are preferably based on 75 to 90% by weight of component a), 10 to 25% by weight of component b) and 0 to 1% by weight of component c).

Component a) is a urethane-modified polyester resin containing chemically incorporated carboxylate groups and having a weight average molecular weight ($M_w$, as determined by gel permeation chromatography using polyesters as the standard) of 5,000 to 50,000, preferably 7,500 to 30,000; an acid value of 15 to 36, preferably 20 to 29.9; and a hydroxyl value of at least 40, preferably 60 to 100. The resin generally contains 6.5 to 10.5% by weight of urethane groups, —NH—CO—O. The counterions to the carboxylate groups are generally cations based on ammonia or on organic, preferably tertiary, amines. Since carboxyl groups neutralized with such comparatively weak bases are also included in the determination of the acid values by titration with potassium hydroxide, all data regarding the acid values are based both on free carboxyl groups and on the neutralized carboxyl groups. In addition, the hydroxyl and acid values are always based on the quantity of KOH in "mg" which is used to titrate 1 g.of substance.

The urethane-modified polyester resins a) are produced by reacting a1) 72 to 80% by weight, preferably 73 to 77% by weight, of a polyester polyol having a hydroxyl value of 130 to 200, preferably 145 to 180, and an acid value of 1 to 5, preferably 1 to 3.5, with a2) 4 to 7% by weight, preferably 5 to 6.5% by weight, of a 2,2-bis-(hydroxymethyl)alkanecarboxylic acid or a quantity corresponding to this quantity of acid of a tertiary amine salt of such acid and a3) 15 to 24% by weight, preferably 17 to 22% by weight, of at least one cycloaliphatic diisocyanate having a molecular weight of 166 to 294, preferably 222 to 294, wherein all of the percentages are based on the total weight of a1) to a3).

The polyester polyols a1) are based on the reaction product of a1.1) 2 to 11% by weight, preferably 3 to 9.5% by weight, of a monocarboxylic acid, a1.2) 17 to 27% by weight, preferably 20 to 25% by weight, of an aliphatic dicarboxylic acid, a1.3) 20 to 30% by weight, preferably 22 to 28% by weight, of a cycloaliphatic or aromatic dicarboxylic acid or dicarboxylic anhydride, a1.4) 27 to 41% by weight, preferably 30 to 39% by weight, of a (cyclo)aliphatic diol component and a1.5) 13 to 21% by weight, preferably 15 to 19% by weight, of a polyol component, wherein the percentages are based on the total weight of a1.1) to a1.5).

The polyester resins a1) are produced in known manner by reaction of the starting materials set forth. The reaction is optionally carried out in the presence of known esterification catalysts. The reaction is preferably conducted by melt or azeotropic condensation, optionally under vacuum, at temperatures of 140° to 220° C. with elimination of water.

The starting component a1.1) is based on at least one monocarboxylic acid having a molecular weight of 122 to 340. Suitable monocarboxylic acids include saturated fatty acids such as 2-ethylhexanoic acid, isononanoic acid, decanoic acid, octadecanoic acid, coconut oil fatty acid, soybean oil fatty acid, safflower oil fatty acid, peanut oil fatty acid and mixtures of these monocarboxylic acids.

Component a1.2) is based on at least one aliphatic dicarboxylic acid having a molecular weight of 116 to 600. Suitable dicarboxylic acids a1.2) include adipic acid, succinic acid, sebacic acid, suberic acid, dimeric fatty acid and mixtures of these acids.

Component a1.3) is based on at least one cycloaliphatic or aromatic dicarboxylic acid having a molecular weight of 166 to 172 or at least one anhydride of these acids. Suitable dicarboxylic acids and anhydrides include phthalic acid, phthalic acid anhydrides, isophthalic acid, terephthalic acid, tetrahydrophthalic acid, tetrahydrophthalic acid anhydride, hexahydrophthalic acid, hexahydrophthalic acid anhydride and mixtures of these acids or anhydrides.

Component a1.4) is based on at least one aliphatic or cycloaliphatic diol having a molecular weight of 62 to 400, wherein at least 50% of the diol component is selected from diprimary diols containing 5 to 8 carbon atoms. Suitable diols include ethylene glycol, 1,3- and 1,2-propylene glycol, butane-1,4-, -1,3- and -2,3-diol, hexane-1,6-diol, diethylene glycol, triethylene glycol, octane-1,8-diol, hydrogenated bisphenols, 1,4-cyclohexanediol, 1,4-cyclohexane dimethanol, neopentyl glycol and mixtures of these diols.

Component a1.5) is based on at least one trihydric or tetrahydric alcohol having a molecular weight of 92 to 300. Suitable polyols include glycerol, trimethylol propane and pentaerythritol.

When components a1.1) to a1.5) are subjected to azeotropic esterification, the entraining agent (e.g., typically isooctane, xylene, toluene or cyclohexane) is distilled off under vacuum on completion of the reaction.

Component a2) is based on at least one 2,2-bis-(hydroxymethyl)-alkane carboxylic acid containing a total of at least 5 carbon atoms, preferably 2,2-bis-(hydroxymethyl)-propionic acid (dimethylol propionic acid) or a tertiary amine salt of such an acid.

Component a3) is based on at least one cycloaliphatic diisocyanate having a molecular weight of 166 to 294, preferably 222 to 294. Suitable diisocyanates include 1-isocyanato-3,3,5-trimethyl-5-isocyanatomethylcyclohexane (isophorone diisocyanate or IPDI) and perhydro-2,4'- and -4,4'-diphenyl methane diisocyanate.

The urethane-modified polyester resins a) may be prepared, for example, by homogenizing the polyester a1), the 2,2-bis-(hydroxymethyl)-alkane carboxylic acid a2) or its salt and the solvent preferably used, adding the diisocyanate a3) over a period of about 1 minute to 2 hours at 50° to 120° C. and stirring of the reaction mixture at 50° to 140° C. using the heat of the exothermic reaction until a resin having the requirements set forth above is obtained.

The reaction may be carried out in the presence of suitable catalysts (for example dibutyl tin oxide, dibutyl tin dilaurate and also tertiary amines such as triethylamine) which are generally added in quantities of 0.01 to 2.5% by weight, based on the weight of the reaction mixture as a whole. When tertiary amines are used, such as triethylamine, the carboxyl groups present are at least partly neutralized at the same time.

The reaction may be carried out in the melt, although it is preferably carried out in the presence of solvents inert to isocyanate groups at solids contents of 40 to 90% by weight. Suitable solvents include dimethyl diglycol, N-methyl pyrrolidone, N-methyl caprolactone, ethyl glycol acetate, acetone, methyl ethyl ketone or mixtures of these solvents with other solvents such as n-butyl acetate, methoxypropyl acetate, xylene, toluene and solvent naphtha.

When the residual content of organic solvent has to meet particularly stringent demands, all or part of the solvent may be distilled off before, during and/or after neutralization or dispersion of the resin in water.

After the urethanization reaction, small quantities of other organic solvents, such as ethanol, n-propanol, isopropanol, n-butanol, isobutanol, tert.-butanol, pentanol, hexanol, octanol, butyl glycol, ethyl glycol, butyl diglycol, ethyl diglycol, methyl diglycol and methoxypropanol, may also be added depending upon the properties desired.

The resins or rather the resin solution is dispersed in water or, unless the carboxyl groups have already been at least partly neutralized, in a mixture of water and neutralizing agent.

Neutralizing agents are used in quantities such that 45 to 100%, preferably 50 to 80%, of the groups capable of forming anions are neutralized. Suitable neutralizing agents include ammonia, triethylamine, tripropylamine, tributylamine, triethanolamine, monoethanolamine, N,N-dimethyl ethanolamine, N-methyl ethanolamine, diethanolamine, N-methyl diethanolamine, diisopropanolamine, triisopropanolamine, morpholine, N-methyl morpholine, 2-amino-2-methyl-1-propanol and mixtures of these neutralizing agents. Ammonia and N,N-dimethyl ethanolamine are particularly preferred. Although alkali hydroxides, such as sodium or potassium hydroxide, may also be used as neutralizing agents, they are less preferred.

After the dispersion step, the solvent content may optionally be (further) reduced by distillation. The quantity of dispersion water and solvent used and the quantity of solvent distilled off are selected so that dispersions of the urethane-modified polyester resins a) ultimately obtained have solids contents of 38 to 48% by weight, preferably 42 to 48% by weight. The organic solvent content of the dispersions is preferably below 7% by weight. In the context of the invention, the term "dispersion" is always meant to encompass solutions because the transition from solution to dispersion is fluid and primarily depends upon the level of hydrophilic modification.

In addition to the urethane-modified polyester resins a), the binder compositions according to the invention contain crosslinker resins b) in the quantities previously set forth.

The crosslinker resins b) may be water-dilutable or water-dispersible substances, although hydrophobic substances which cannot be dispersed in water on their own may also be used as the crosslinker resins. This is because the urethane-modified polyester resins a) can perform the function of an emulsifier for the crosslinker resins b).

Suitable crosslinker resins b) include water-dilutable and water-dispersible melamine- or urea-formaldehyde condensates, for example those described in D. H. Solomon, The Chemistry of Organic Filmformers, pages 235 et seq, John Wiley & Sons, Inc., New York, 1967. However, the melamine resins may also be completely or partly replaced by other crosslinking amino plastics, for example those described in "Methoden der Organischen Chemie" (Houben-Weyl), Vol. 14/2, Part 2, 4th Edition, Georg Thieme Verlag, Stuttgart 1963, pages 319 et seq.

Other suitable crosslinker resins are blocked polyisocyanates, for example those based on isophorone diisocyanate, hexamethylene diisocyanate, 1,4-diisocyanatocyclohexane, bis-(4-isocyanatocyclohexyl)-methane, 1,3-diisocyanatobenzene, 1,4-diisocyanatobenzene, 2,4-diisocyanato-1-methyl-benzene, 1,3-diisocyanato-2-methyl benzene, 1,3-bis-isocyanatomethyl benzene, 2,4-bis-isocyanatomethyl-1,5-dimethyl benzene, bis-(4-isocyanatophenyl)-propane, tris-(4-isocyanatophenyl)-methane, trimethyl-1,6-diisocyanatohexane hexane or those based on polyisocyanate adducts such as biuret polyisocyanates prepared from 1,6-diisocyanatohexane, isocyanurate polyisocyanates prepared from 1,6-diisocyanatohexane and polyisocyanates containing urethane groups and prepared by reacting 2,4-and/or 2,6-diisocyanatotoluene or isophorone diisocyanate with low molecular weight polyhydroxyl compounds such as trimethylol propane, the isomeric propanediols or butanediols or mixtures of such polyhydroxyl compounds. Suitable blocking agents for these polyisocyanates include monohydric alcohols such as methanol, ethanol, butanol, hexanol, cyclohexanol and benzyl alcohol; oximes such as acetoxime and methyl ethyl ketoxime; lactams such as ε-caprolactam; and phenols.

Preferred crosslinker resins are melamine and urea resins, more preferably alkylated melamine-formaldehyde resins containing 1 to 8 carbon atoms in the alkyl chain, such as butylated, methylated and/or methoxymethylated melamine resins.

The binder compositions according to the invention may optionally contain emulsifiers c) in the quantities mentioned above as a further component. Suitable emulsifiers c) are described in Ullmann's Encyclopadie der technischen Chemie, 4th Edition, vol. 10, pages 449 to 473, Verlag Chemie, Weinheim 1975. Preferred nonionic emulsifiers are compounds corresponding to the following formulae

wherein

R[1] and R[2] may be the same or different and represent aliphatic, cycloaliphatic, araliphatic, alkaromatic or aromatic hydrocarbon radicals containing 6 to 25 carbon atoms, R[3] and R[4] each represent alkylene oxide units containing 2 to 4 carbon atoms wherein at least 60% by weight, preferably 100% by weight are ethylene oxide units.

The known ethoxylation products of $C_{8-18}$ alkylphenols which contain an average of more than 10 ethylene oxide units, preferably at least 20 ethylene oxide units, per molecule and mixtures thereof are particularly suitable.

The binder compositions according to the invention or aqueous dispersions prepared therefrom may be prepared simply by mixing the individual components a), b) and c).

In addition to the aqueous binder compositions, the automobile fillers according to the invention may contain the auxiliaries and additives typically used in paint technology such as pigments, fillers, anti-sedimenting agents, thickeners, flow control agents, foam inhibitors, etc. Some of these additives may even be added to the reaction mixture during production of the aqueous binders providing this does not interfere with the production process.

In one preferred embodiment, an aqueous filler is produced by the process according to the invention by conducting the first and second steps for example in a one-pot process.

The aqueous stoving fillers containing binder compositions according to the invention are high-quality aqueous paints for the coating of automobile parts. They may be applied by known methods including spray coating, flood coating and dip coating.

The paints cure at temperatures above 120° C. to form clear, crosslinked coatings.

In the following examples, all parts and percentages are by weight unless otherwise indicated.

EXAMPLES

EXAMPLE 1 a1.1) 468 g (3.5%) isononanoic acid,
a1.2) 2,931 g (21.7%) adipic acid,
a1.3) 3,330 g (24,7%) isophthalic acid,
a1.4) 2,853 g (21.1%) hexane-1,6-diol and 1,602 g 11.9% 1,4-cyclohexane dimethanol and
a1.5) 2,316 g (17.1%) trimethylol propane were weighed into a 15 liter reaction vessel equipped with a stirrer, cooling system and heating system, and heated in 1 hour to 140° C. while nitrogen was passed through. The reaction mixture was then heated over a period of 3 hours to 150° C. and then over a period of 7 hours to 220° C., and maintained at that temperature until the acid value was 2.6. The reaction mixture was then cooled to 100° C. The polyester polyol a1) obtained had a hydroxyl value of 178.

a1) 7,000 g (73.6%) of the polyester polyol,
a2) 593 g (6.2%) dimethylol propionic acid 1,421 g N-methyl pyrrolidone and 23.8 g (0.25%) tin(II) octoate (catalyst)

were heated under nitrogen to 120° C. and homogenized for 30 minutes. After homogenization, the reaction mixture was cooled to 70° C. and 1,917 g (20.2%) isophorone diisocyanate [a3)] were added all at once with vigorous stirring. The reaction mixture was then kept for 1 hour at 100° C., heated to 130° C. over a period of 1 hour and kept at 130° C. until the NCO content was below 0.1%. The resulting solution of the urethane-modified polyester resin (10,954 g) was then dispersed in a solution of 275 g N,N-dimethyl ethanolamine in 10,146 g water. An aqueous dispersion of a urethane-modified polyester resin a) having a solids content of 44.6% was obtained in this way. The dispersed solid had an acid value of 29.8. The solvent content of the dispersion was 6.6%. The degree of neutralization, based on dimethylol propionic acid, was 70%.

EXAMPLE 2 a1.1) 365 g (8.1%) isononanoic acid,
a1.2) 895 g (20.0%) adipic acid,
a1.3) 1,017 g (22.7%) isophthalic acid,
a1.4) 761 g (17.0%) hexane-1,6-diol and 674 g (15.0%) 1,4-cyclohexane dimethanol and
a1.5) 771 g (17.2%) trimethylol propane were weighed into a 10 liter reaction vessel equipped with a stirrer, cooling system and heating system and reacted as described in Example 1 to form a polyester a1) having an acid value of 2.9 and an OH value of 172. The yield was 4,000 g.

a1) 4,000 g (73.5%) of the polyester
a2) 334 g (6.1%) dimethylol propionic acid, 810 g N-methyl pyrrolidone, 2,806 g butyl acetate and 13.7 g (0.25%) tin(II) octoate were heated under nitrogen to 60° C. and homogenized. 1,106 g (20.4%) isophorone diisocyanate [a3)] were added in 30 minutes and the reaction mixture was heated to 110° C. using the heat of the exothermic reaction. The reaction mixture was stirred at 110° C. until no more NCO groups were detected. Butyl acetate was then distilled off by application of a light vacuum (10 to 100 mbar) and the resulting 87% resin solution was dispersed in a solution of 155 g N,N-dimethyl ethanolamine in 5,700 g water. An aqueous dispersion of a urethane-modified polyester resin a) having a solids content of 45% was obtained. The dispersed polyester resin had an acid value of 28.6. The dispersion contained 6.7% solvent. The degree of neutralization, based on dimethylol propionic acid, was 70%.

EXAMPLE 3 a1.1) 244 g (6.1%) soybean oil fatty acid,
a1.2) 944 g (23.5%) adipic acid,
a1.3) 784 g (19.5%) isophthalic acid and 132 g (3.3%) hexahydrophthalic anhydride,
a1.4) 1,000 g (24.9%) hexane-1,6-diol and 228 g (5.7%) cyclohexane-1,4-diol and
a1.5) 680 g (17.0%) trimethylol propane were weighed into a 5 liter reaction vessel equipped with a stirrer, cooling system and heating system and reacted as described in Example 1 to form a polyester polyol a1) having a hydroxyl value of 177 and an acid value of 1.9.

a1) 3,060 g (73.5%) of this polyester
a2) 261 g (6.3%) dimethylol propionic acid were dissolved in 6,000 g acetone at 50° C. A mixture of 4.5 g (0.1%) tin(II) octoate and 840 g (20.2%) isophorone diisocyanate was then added over a period of 30 minutes. The reaction mixture was stirred under reflux until no more NCO groups were detected. 110 g N,N-dimethyl ethanolamine and 4,700 g water were then added and the acetone was distilled off by intensified passage of inert gas at temperatures of 60° to 100° C.

A solvent-free binder dispersion having a solids content of 45.5% and an acid value of 28.5, based on solids, was obtained.

Ready-to-use stoving fillers were prepared from the dispersions of urethane-modified polyester resins a) described in Examples 1 to 3. Quantities of the dispersions corresponding to 88 parts by weight dispersed solids were used for this purpose. These dispersions were ground with 12 parts by weight (expressed as 100% solids) of a commercially available melamine resin (Maprenal MF 904, a product of Hoechst AG); 80 parts by weight of a pigment mixture containing 53 parts by weight titanium dioxide, 2 parts by weight iron oxide black, 20 parts by weight of finely powdered heavy spar and 5 parts by weight microtalcum; 0.5 part by weight of a commercially available flow control agent (Additol XW 395, a product of Hoechst AG) and 0.25 part by weight of a commercially available foam inhibitor (Entschäumer DNE, a product of Bayer AG) in a bead mill to form a stoving filler.

The stoving fillers thus prepared were applied by spray gun to steel plates provided with a CED (cathodic electrodeposition) primer and, after airing for 10 minutes at room temperature, were stoved for 20 minutes at 150° to 160° C. to form a filler layer having a dry film thickness of approximately 40 μm. A finishing varnish based on alkyd resin/melamine was then applied (clear varnish, dry film thickness approx. 40 μm). After stoving of the finishing varnish for 20 minutes at 150° C., the coatings obtained had the following properties:

|  | Example | | |
| --- | --- | --- | --- |
|  | 1 | 2 | 3 |
| Pendulum hardness (sec) DIN 53156 | 85 | 113 | 145 |
| Erichsen indentation (mm) DIN | 10 | >10 | 9 |
| Gardner gloss (%) (60° angle) | 83 | 82 | 83 |
| Chip test[1] | 1-2 | 1 | 1 |
| Paint adhesion[2] | 1 | 1-2 | 1-2 |

[1]DIN 53230, values of 1 to 6
1 = very good adhesion to substrate
6 = very poor adhesion to substrate
[2]according to DIN 53157; values of 1 to 3
1 = very good adhesion
3 = poor adhesion In addition, the stoving fillers mentioned were applied to degreased, but not primed steel sheets and stoved for 20 minutes at 165° C. to form a filler layer having a dry film thickness of 40 μm. Salt spray testing (180 hours) of the filler layer provided with a cut in accordance with DIN 53 167 produced the following creepage results:

|  | Example | | |
| --- | --- | --- | --- |
|  | 1 | 2 | 3 |
| Salt spray test (mm) DIN 53 167 | 8 | 3 | 8 |

The filler binders were stable in storage for at least 1 year at room temperature with no loss of properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-dispersible binder composition which is suitable for the production of a stoving filler to be processed from aqueous phase, said binder composition comprising
   a) 65 to 95% by weight of a urethane-modified polyester resin containing carboxyl groups, having an acid value of 15 to 36, a hydroxyl value of at least 40 and a molecular weight (Mw) of 5,000 to 50,000 and comprising the reaction product of
      a1) 72 to 80% by weight of a polyester polyol having a hydroxyl value of 130 to 200 and an acid value of 1 to 5 and comprising the reaction product of
         a1.1) 2 to 11% by weight of at least one aliphatic monocarboxylic acid having a molecular weight of 122 to 340,
         a1.2) 17 to 27% by weight of at least one aliphatic dicarboxylic acid having a molecular weight of 116 to 600,
         a1.3) 20 to 30% by weight of at least one aromatic or cycloaliphatic dicarboxylic acid having a molecular weight in the range from 166 to 172 and/or at least one anhydride thereof,
         a1.4) 27 to 41% by weight of at least one aliphatic or cycloaliphatic diol having a molecular weight of 62 to 400, provided that at least 50% by weight of this component is based on a diprimary diol containing 5 to 8 carbon atoms and
         a1.5) 13 to 21% by weight of at least one trihydric or tetrahydric alcohol having a molecular weight of 92 to 300, wherein the percentages are based on the total weight of components a1.1) to a1.5), and
      a2) 4 to 7% by weight of a 2,2-bis-(hydroxymethyl)-alkane carboxylic acid or a quantity corresponding to this quantity of acid of a tertiary amine salt of said acid with
      a3) 15 to 24% by weight of at least one cycloaliphatic diisocyanate having a molecular weight of 166 to 294,
   wherein the percentages of a1), a2), and a3) are based on the total weight of a1) to a3),
   b) 5 to 35% by weight of a crosslinker resin and
   c) 0 to 2% by weight of an emulsifier,
   wherein the percentages of a), b), and c) are based on the total weight of a) to c).

2. The binder composition of claim 1 wherein the carboxyl groups are at least partially neutralized with ammonia or an organic amine.

3. The binder composition of claim 1 wherein crosslinker resin b) comprises at least one amino resin and/or at least one blocked polyisocyanate.

4. The binder composition of claim 1 wherein emulsifier c) comprises at least one ethoxylated $C_{8-18}$ alkylphenol containing at least 10 ethylene oxide units per molecule.

5. A water dispersible binder composition which is suitable for the production of a stoving filler to be processed from aqueous phase, said binder composition comprising
   a) 75 to 90% by weight of a urethane-modified polyester resin containing carboxyl groups, having an acid value of 20 to 29.9, a hydroxyl value of at least 40 and a molecular weight (Mw) of 7,500 to 30,000 and comprising the reaction product of a1) 73 to 77% by weight of a polyester polyol having a hydroxyl value of 145 to 180 and an acid value of 1 to 3.5 and comprising the reaction product of
- a1.1) 2 to 11% by weight of at least one aliphatic monocarboxylic acid having a molecular weight of 122 to 340,
- a1.2) 17 to 27% by weight of at least one aliphatic dicarboxylic acid having a molecular weight of 116 to 600,
- a1.3) 20 to 30% by weight of at least one aromatic or cycloaliphatic dicarboxylic acid having a molecular weight in the range from 166 to 172 and/or at least one anhydride thereof,
- a1.4) 27 to 41% by weight of at least one aliphatic or cycloaliphatic diol having a molecular weight of 62 to 400, provided that at least 50% by weight of this component is based on a diprimary diol containing 5 to 8 carbon atoms and
- a1.5) 13 to 21% by weight of at least one trihydric or tetrahydric alcohol having a molecular weight of 92 to 300, wherein the percentages are based on the total weight of components a1.1) to a1.5), and a2) 5 to 6.5% by weight of a 2,2-bis-(hydroxymethyl)-alkane carboxylic acid or a quantity corresponding to this quantity of acid of a tertiary amine salt of said acid with a3) 17 to 22% by weight of at least one cycloaliphatic diisocyanate having a molecular weight of 222 to 294, wherein the percentages of a1), a2) and a3) are based on the total weight of a1) to a3), b) 10 to 25% by weight of a crosslinker resin and c) 0 to 1% by weight of an emulsifier, wherein the percentages of a), b) and c) are based on the total weight of a) to c).

6. The binder composition of claim 5 wherein the carboxyl groups are at least partially neutralized with ammonia or an organic amine.

7. The binder composition of claim 5 wherein crosslinker resin b) comprises at least one amino resin and/or at least one blocked polyisocyanate.

8. The binder composition of claim 5 wherein emulsifier c) comprises at least one ethoxylated $C_{8-18}$ alkylphenol containing at least 10 ethylene oxide units per molecule.

9. A process for the production of an aqueous stoving filler which is suitable for the production of chip resistant coatings which comprises I) preparing a polyester polyol a1) having a hydroxyl value of 130 to 200 and an acid value of 1 to 5 by reacting
- a1.1) 2 to 11% by weight of at least one aliphatic monocarboxylic acid having a molecular weight of 122 to 340,
- a1.2) 17 to 27% by weight of at least one aliphatic dicarboxylic acid having a molecular weight of 116 to 600,
- a1.3) 20 to 30% by weight of at least one aromatic or cycloaliphatic dicarboxylic acid having a molecular weight in the range from 166 to 172 and/or at least one anhydride thereof,
- a1.4) 27 to 41% by weight of at least one aliphatic or cycloaliphatic diol having a molecular weight of 62 to 400, provided that at least 50% by weight of this component is based on a diprimary diol containing 5 to 8 carbon atoms and
- a1.5) 13 to 21% by weight of at least one trihydric or tetrahydric alcohol having a molecular weight of 92 to 300, wherein the percentages are based on the total weight of components a1.1) to a1.5).

II) preparing a urethane-modified polyester resin a) having a molecular weight ($M_w$) of 5,000 to 50,000, an acid value of 15 to 36 and a hydroxyl value of at least 40 by reacting in the presence of an inert solvent at 50° to 140° C.
- a1) 72 to 80% by weight of the polyester a1) and
- a2) 4 to 7% by weight of a 2,2-bis-(hydroxymethyl)alkane carboxylic acid or with a quantity corresponding to this quantity of acid of a tertiary amine salt of said acid with
- a3) 15 to 24% by weight of a cycloaliphatic diisocyanate having a molecular weight of 166 to 294 wherein the percentages are based on the total weight of components a1) to a3),

III) adding a quantity of emulsifiers c) which is sufficient to provide a weight ratio of urethane-modified polyester resin a) to emulsifier c) of 65:2 to 95:0 and IV) mixing the product of step III) and a crosslinker resin with water, the crosslinker resin being present in an amount sufficient to provide a weight ratio of component a) to component b) of 65:35 to 95:5.

10. The process of claim 9 which comprises at least partially converting any carboxyl groups present in component a) to carboxylate groups with ammonia or an amine after step IV).

11. The process of claim 9 which comprises at least partially removing the organic solvent by distillation before, during or after step IV).

12. A chip resistant coating prepared from a stoving filler containing the binder composition of claim 1.

* * * * *